(12) United States Patent
Liu

(10) Patent No.: US 11,453,344 B2
(45) Date of Patent: Sep. 27, 2022

(54) TOP TUBE ADAPTOR

(71) Applicant: YEONG TON INDUSTRIAL CO., LTD., Tainan (TW)

(72) Inventor: Yao-Huang Liu, Tainan (TW)

(73) Assignee: YEONG TON INDUSTRIAL CO., LTD., Tainan (TW)

( * ) Notice: Subject to any disclaimer, the term of this patent is extended or adjusted under 35 U.S.C. 154(b) by 337 days.

(21) Appl. No.: 16/855,474

(22) Filed: Apr. 22, 2020

(65) Prior Publication Data
US 2021/0331627 A1    Oct. 28, 2021

(51) Int. Cl.
*B60R 9/10* (2006.01)
*F16B 45/02* (2006.01)
*E05B 71/00* (2006.01)

(52) U.S. Cl.
CPC ............... *B60R 9/10* (2013.01); *F16B 45/02* (2013.01); *E05B 71/00* (2013.01)

(58) Field of Classification Search
CPC .. B60R 9/10; F16B 45/02; F16B 7/105; F16B 45/023; E05B 71/00
See application file for complete search history.

(56) References Cited

U.S. PATENT DOCUMENTS

| | | | | |
|---|---|---|---|---|
| 5,282,555 A * | 2/1994 | Muir | ......................... | B60R 9/10 224/532 |
| 6,435,523 B1 * | 8/2002 | Hilk | ....................... | B62K 13/08 280/7.11 |
| 6,471,232 B2 * | 10/2002 | Huang | ...................... | B62H 5/04 280/304.5 |
| 6,503,019 B1 * | 1/2003 | Wang | ...................... | B62K 13/00 403/321 |
| 6,602,015 B1 * | 8/2003 | Evans | ....................... | B60R 9/10 403/109.5 |
| 9,168,968 B2 * | 10/2015 | Pomerantz | ............. | B62K 19/30 |
| 9,174,072 B2 * | 11/2015 | Strasser | .............. | E04G 21/3295 |
| 10,173,085 B2 * | 1/2019 | Dehondt | ................. | A63B 29/02 |
| 10,328,984 B2 * | 6/2019 | Wang | ........................ | B62K 3/04 |
| 2002/0043085 A1 * | 4/2002 | Huang | ..................... | B62H 5/00 70/233 |
| 2002/0192015 A1 * | 12/2002 | Wang | ....................... | B62J 11/20 403/109.5 |
| 2012/0112429 A1 * | 5/2012 | Wang | ..................... | B62K 19/18 280/281.1 |

(Continued)

*Primary Examiner* — David M Upchurch
(74) *Attorney, Agent, or Firm* — Alan D. Kamrath; Karin L. Williams; Mayer & Williams PC

(57) ABSTRACT

A top tube adaptor contains: a body, two fixers, and a slidable rod. The body includes at least one slot, and a respective positioning rack has multiple teeth. The slidable rod includes a channel and a locking seat for accommodating a rotatable connector. The rotatable connector includes two shafts, a press portion, a button, an orientation segment, an engagement portion, and a first resilient element. A respective fixer includes a curved hook, a cutout, two tabs, a coupling projection, a column, and a second resilient element. The second resilient element has two abutting segments, one of the two abutting segments abuts against the two tabs, and the other abutting segment contacts with or removes from the coupling projection so as to close or open the cutout. The two fixers are connected with two ends of the slidable rod respectively.

4 Claims, 14 Drawing Sheets

(56) References Cited

U.S. PATENT DOCUMENTS

| | | | |
|---|---|---|---|
| 2013/0213735 A1* | 8/2013 | Dehondt | A62B 35/0087 |
| | | | 24/600.1 |
| 2017/0341696 A1* | 11/2017 | Wang | B62J 23/00 |
| 2019/0039671 A1* | 2/2019 | Broadbent | B62J 7/04 |
| 2019/0315286 A1* | 10/2019 | Hallenbert | B60R 9/10 |
| 2021/0046881 A1* | 2/2021 | Vidar | B60R 9/058 |

* cited by examiner

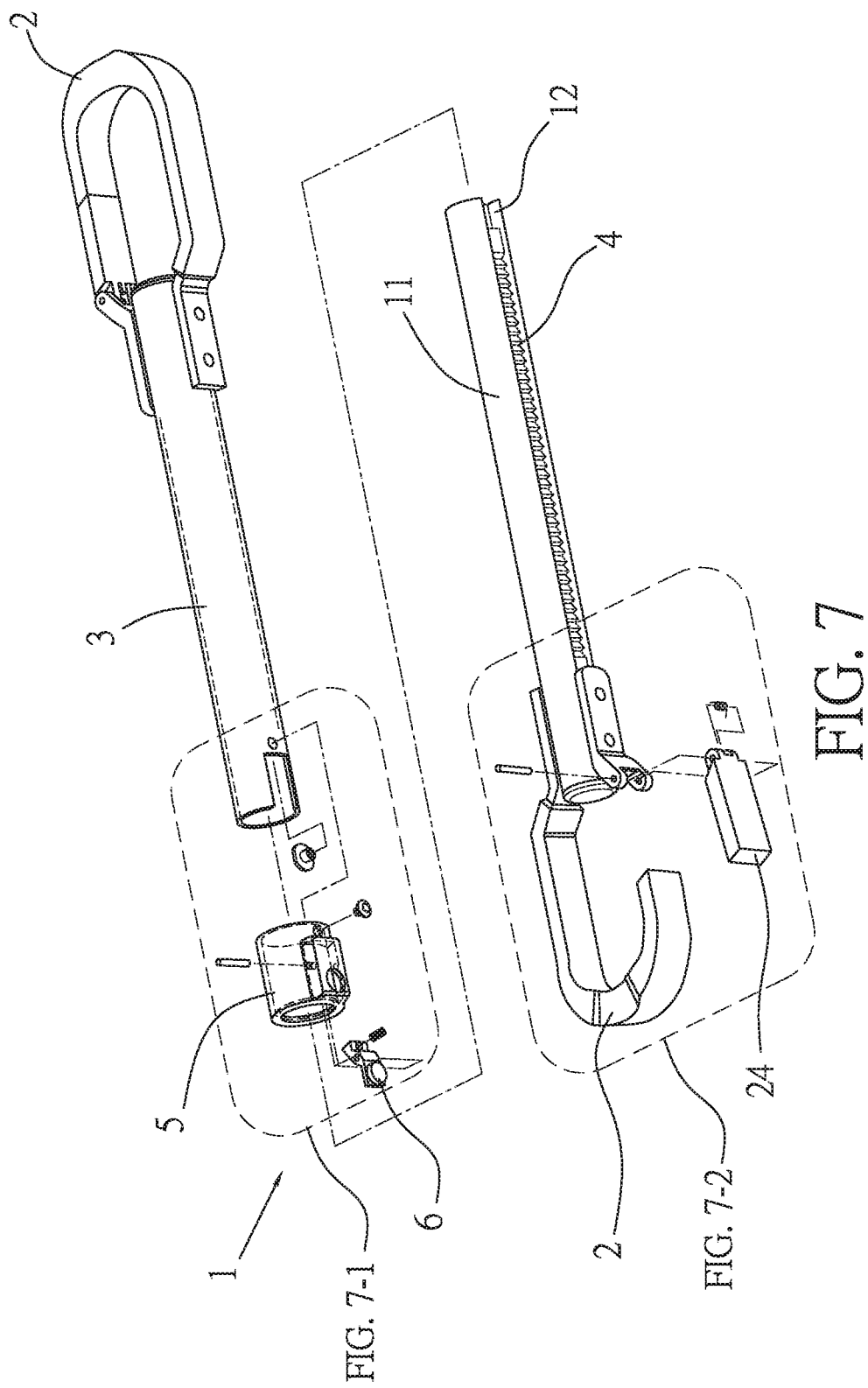

TOP TUBE ADAPTOR

BACKGROUND OF THE INVENTION

Field of the Invention

The present invention relates to a top tube adaptor which is applied to auxiliarily fix a bicycle on a bicycle carrier of a car.

Description of the Prior Art

A conventional top tube adaptor 10 is applied to fix a bicycle B0 on a bicycle carrier of a car A0. The conventional top tube adaptor 10 contains a first tube 101, a locking hook 102 extending from an end of the conventional top tube adaptor 10, a second tube 103 movably expanded and retracted on an outer wall of the first tube 101, and another locking hook 102 connected with an end of the second tube 103. However, the second tube 103 cannot be fixed with respect to the first tube 101 after being expended or retracted, and the two locking hooks 102 cannot be closed, thus falling the bicycle from the car A0 easily, as shown in FIG. 1.

To solve above-mentioned problem, a slot 104 is defined on the first tube 101, and the second tube 103 has a positioning bolt 105 accommodated in the slot 104, but the slot 104 and the positioning bolt 105 cannot fix the first tube 101 and the second tube 103, as shown in FIGS. 2, 2-1, 2-2, 3, and 4.

In addition, a retainer 106 is mounted between the first tube 101 and the second tube 103 to control a rotary knob 107 to open and close a respective looking hook 102, as illustrated in FIGS. 2, 2-1, 2-2, 4, and 5. Nevertheless, a drive sheet 1061 of the retainer 106 is too rigid to operate it easily, thus having operational inconvenience, as illustrated in FIGS. 2, 2-1, 2-2, and 4.

The present invention has arisen to mitigate and/or obviate the afore-described disadvantages.

SUMMARY OF THE INVENTION

The primary objective of the present invention is to provide a top tube adaptor which contains a coupling projection rotatably connected with two tabs and closing a cutout, at least one positioning rack, a respective positioning rack having multiple teeth, a locking seat rotatably connected with a rotatable connector, the rotatable connector having an orientation segment extending into at least one slot, and an engagement portion formed on an inner side of the orientation segment and retained with one of the multiple teeth.

To achieve above-mentioned objective, a top tube adaptor provided by the present invention contains: a body, two fixers connected with two ends of the body respectively, and a slidable rod fitted with one of the two fixers.

The body includes at least one slot defined on an outer wall thereof and configured to accommodate at least one positioning rack, and a respective positioning rack has multiple teeth.

The slidable rod includes a channel configured to slide the slidable rod along the body, and the slidable rod includes a locking seat rotatably connected with an end of the slidable rod and accommodating a rotatable connector. The rotatable connector includes two shafts rotatably connected with two sides of a middle section of the rotatable connector respectively, a press portion extending from a first end of the rotatable connector, a button extending from the press portion, an orientation segment extending into the at least one slot from a second end of the rotatable connector, an engagement portion formed on an inner side of the orientation segment and retained with one of the multiple teeth, and a first resilient element abutting against an inner side of the orientation segment and fixed in the locking seat.

A respective fixer includes a curved hook extending from an end thereof, a cutout defined between the end of the respective fixer and the curved hook, two tabs located beside the cutout away from the curved hook, a coupling projection rotatably connected with the two tabs and closing the cutout, a column inserted through the two tabs, and a second resilient element fitted on the column. The second resilient element has two abutting segments, one of the two abutting segments abuts against the two tabs, and the other abutting segment contacts with or removes from the coupling projection so as to close or open the cutout.

The two fixers are connected with two ends of the slidable rod respectively.

Preferably, the respective fixer further includes a locating member configured to connect with the body and an abutting section formed on the locating member. The locating member has the curved hook curvedly extending from the body, and the curved hook has a distal segment straightly extending to the cutout, the curved hook also has a tilted contact face formed on an edge of the distal segment facing the cutout. The abutting section has a slanted extension extending to the cutout, and the abutting section has the two tabs formed on a distal end thereof, the coupling projection is rotatably connected between the two tabs to close the cutout, and the coupling projection has a connection knob extending from an end thereof and rotatably connected with the two tabs by ways of the column. The connection knob has a receiving orifice configured to accommodate the column on which the second resilient element is fitted, the one abutting segment abuts against the receiving orifice, and the other abutting segment contacts with the connection knob so as to close the cutout. The coupling projection further has a beveled biasing face formed on the other end thereof opposite to the connection knob and configured to contact with the tilted contact face.

Preferably, a respective tooth has a first retaining face perpendicular to a bottom of the positioning rack and has a first sliding face connected with the push face. The engagement portion of the orientation segment has a second retaining face for engaging with the first retaining face, and the engagement portion has a second sliding face for engaging with the first sliding face.

Preferably, the body includes the at least one slot defined on an outer wall thereof and configured to accommodate the at least one positioning rack, and the respective positioning rack has the multiple teeth. The slidable rod includes a recess defined the end thereof adjacent to the rotatable connector and includes a first fixing orifice beside the recess, the locking seat includes a first fringe fitted with the slidable rod adjacent to the first fixing orifice, a second fringe contacting with the slidable rod and opposite to the first fringe, a chamber corresponding to the recess, and a second fixing orifice corresponding to the first fixing orifice. The chamber matches with the recess and accommodates the rotatable connector, the chamber has a third fixing orifice configured to accommodate a shank and has a fourth fixing orifice located proximate to the second fringe so that the button extends out of the fourth fixing orifice. A defining member is inserted through the first fixing orifice and the second fixing orifice, and the defining member includes a first part and a second part. The first part has a first head extending into the at least one slot, a peg extending outward from the first head and inserted into the first fixing orifice and the second fixing orifice, and a threaded orifice defined in the first peg. The second part has a second head and has a screwing stem extending outward from the second head and screwed with the threaded orifice, such that the first fringe and the slidable rod are fixed between the first and the second head. The rotatable connector includes the orientation segment extending into the at least one slot from the second end thereof, the orientation segment has the engagement portion formed on the inner side thereof and retained with the one tooth, and the first resilient element abuts against the orientation segment and is fixed in the chamber.

BRIEF DESCRIPTION OF THE DRAWINGS

FIG. 2-1 is an amplified cross-sectional view showing of the assembly of a part of the conventional top tube adaptor.

FIG. 2-2 is another amplified cross-sectional view showing of the assembly of a part of the conventional top tube adaptor.

FIG. 7-1 is an amplified perspective view of a part of FIG. 7 of the present invention.

FIG. 7-2 is another amplified perspective view of a part of FIG. 7 of the present invention.

FIG. 8-1 is an amplified cross sectional view of a part of FIG. 8 of the present invention.

FIG. 8-2 is another amplified cross sectional view of a part of FIG. 8 of the present invention.

FIG. 9-1 is an amplified cross sectional view of a part of FIG. 9 of the present invention.

FIG. 9-2 is another amplified cross sectional view of a part of FIG. 9 of the present invention.

DETAILED DESCRIPTION OF THE PREFERRED EMBODIMENTS

Figure 1:
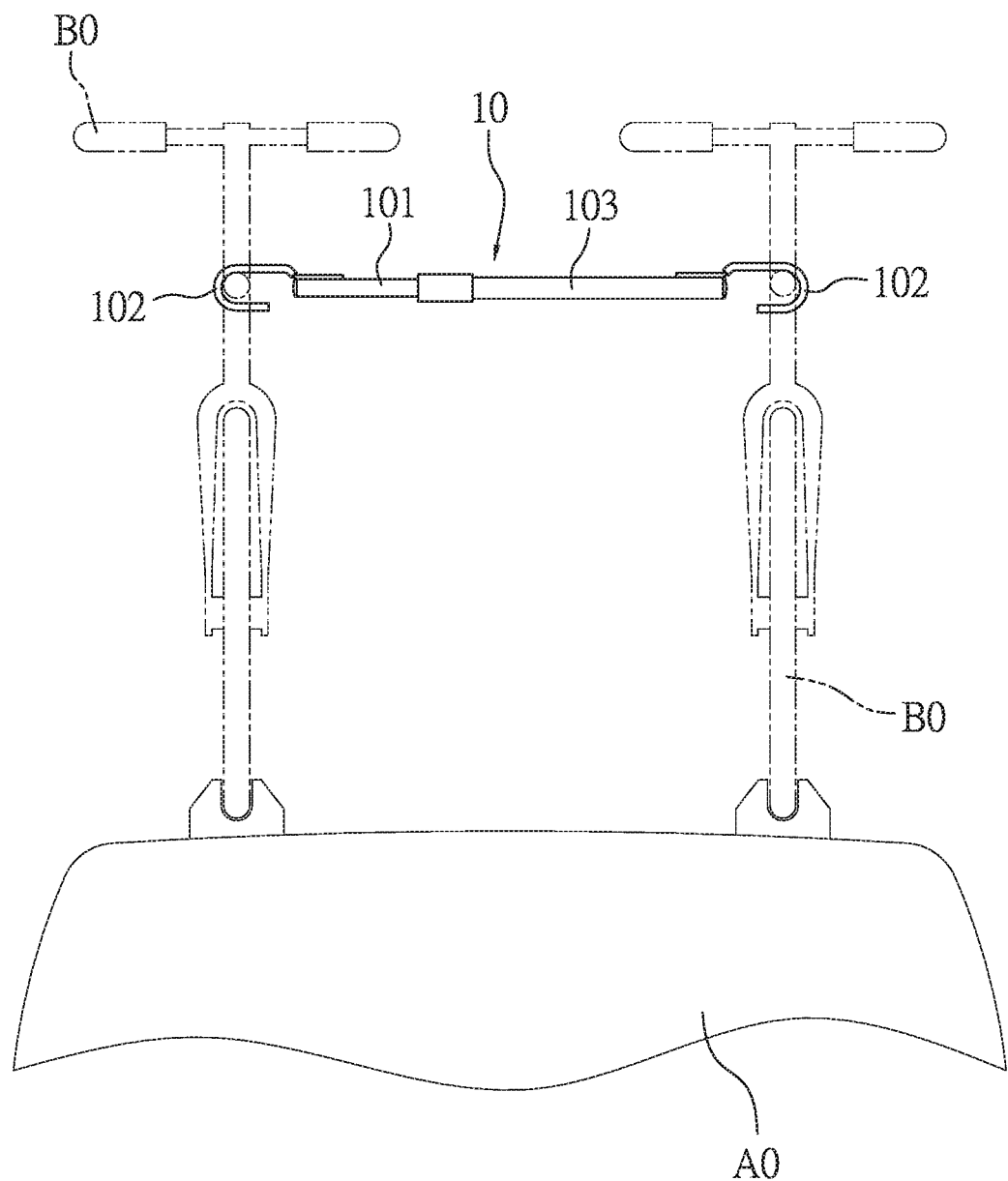
FIG. 1 is a side plan view showing the application of a conventional top tube adaptor.

The present invention will be clearer from the following description when viewed together with the accompanying drawings, which show, for purpose of illustrations only, a preferred embodiment in accordance with the present invention.

With reference to FIGS. 6, 7, 7-1, 7-2, 8, 8-1, and 8-2, a top tube adaptor 1 according to a preferred embodiment of the present invention comprises: a body 11, two fixers 2 connected with two ends of the body 1 respectively, and a slidable rod 3 fitted with one of the two fixers 2. The body 11 includes at least one slot 12 defined on an outer wall thereof and configured to accommodate at least one positioning rack 4, wherein a respective positioning rack 4 has multiple teeth 41. The slidable rod 3 includes a channel 31 configured to slide the slidable rod 3 along the body 11, and the slidable rod 3 includes a locking seat 5 rotatably connected with an end of the slidable rod 3 and accommodating a rotatable connector 6, wherein the rotatable connector 6 includes two shafts 61 rotatably connected with two sides of a middle section of the rotatable connector 6 respectively, a press portion 62 extending from a first end of the rotatable connector 6, a button 63 extending from the press portion 62, an orientation segment 64 extending into the at least one slot 12 from a second end of the rotatable connector 6, an engagement portion 65 formed on an inner side of the orientation segment 64 and retained with one of the multiple teeth 41, and a first resilient element 66 abutting against an inner side of the orientation segment 64 and fixed in the locking seat 5.

A respective fixer 2 includes a curved hook 21 extending from an end thereof, a cutout 22 defined between the end of the respective fixer 2 and the curved hook 21, two tabs 23 located beside the cutout 22 away from the curved hook 21, a coupling projection 24 rotatably connected with the two tabs 23 and closing the cutout 22, a column 25 inserted through the two tabs 23, and a second resilient element 26 fitted on the column 25, wherein the second resilient element 26 has two abutting segments 261, one of the two abutting segments 261 abuts against the two tabs 23, and the other abutting segment 261 contacts with or removes from the coupling projection 24 so as to close or open the cutout 22. Furthermore, the two fixers 2 are connected with two ends of the slidable rod 3 respectively, as shown in FIGS. 6, 7, 7-1, 7-2, 8, 8-1, and 8-2.

The respective fixer 2 further includes a locating member 27 configured to connect with the body 11 and an abutting section 28 formed on the locating member 27; the locating member 27 has the curved hook 21 curvedly extending from the body 11, and the curved hook 21 has a distal segment 211 straightly extending to the cutout 22, and the curved hook 21 has a tilted contact face 212 formed on an edge of the distal segment 211 facing the cutout 22; the abutting section 28 has a slanted extension 281 extending to the cutout 22, and the abutting section 28 has the two tabs 23 formed on a distal end thereof, wherein the coupling projection 24 is rotatably connected between the two tabs 23 to close the cutout 22, and the coupling projection 24 has a connection knob 241 extending from an end thereof and rotatably connected with the two tabs 23 by ways of the column 25, the connection knob 241 has a receiving orifice 242 configured to accommodate the column 25 on which the second resilient element 26 is fitted, wherein the one abutting segment 261 abuts against the receiving orifice 242, and the other abutting segment 261 contacts with or removes from the connection knob 241 so as to close or open the cutout 22. Furthermore, the coupling projection 24 further has a beveled biasing face 243 formed on the other end thereof opposite to the connection knob 241 and configured to contact with the tilted contact face 212, as illustrated in FIGS. 6, 7, 7-1, 7-2, 8, 8-1, and 8-2.

A respective tooth 41 has a first retaining face 411 perpendicular to a bottom of the positioning rack 4 and has a first sliding face 412 connected with the push face 411; the engagement portion 65 of the orientation segment 64 has a second retaining face 651 for engaging with the first retaining face 411 and has a second sliding face 652 for engaging with the first sliding face 412, as shown in FIGS. 7, 7-1, 7-2, 8, 8-1, and 8-2.

The body 11 includes the at least one slot 12 defined on an outer wall thereof and configured to accommodate the at least one positioning rack 4, wherein the respective positioning rack 4 has the multiple teeth 41; the slidable rod 3 includes a recess 32 defined the end thereof adjacent to the rotatable connector 6 and includes a first fixing orifice 33 beside the recess 32, wherein the locking seat 5 includes a first fringe 51 fitted with the slidable rod 3 adjacent to the first fixing orifice 33, a second fringe 52 contacting with the slidable rod 2 and opposite to the first fringe 51, a chamber 53 corresponding to the recess 32, and a second fixing orifice 54 corresponding to the first fixing orifice 33; wherein the chamber 53 matches with the recess 32 and accommodates the rotatable connector 6, the chamber 53 has a third fixing orifice 55 configured to accommodate a shank 61 and has a fourth fixing orifice 56 located proximate to the second fringe 52 so that the button 63 extends out of the fourth fixing orifice 56, wherein a defining member 7 is inserted through the first fixing orifice 33 and the second fixing orifice 54, and the defining member 7 includes a first part 71 and a second part 72; wherein the first part 71 has a first head 711 extending into the at least one slot 12, a peg 712 extending outward from the first head 711 and inserted into the first fixing orifice 33 and the second fixing orifice 54, and a threaded orifice 713 defined in the first peg 712; the second part 72 has a second head 721 and has a screwing stem 722 extending outward from the second head 721 and screwed with the threaded orifice 713, such that the first fringe 51 and the slidable rod 3 are fixed between the first 711 and the second head 721; wherein the rotatable connector 6 includes the orientation segment 64 extending into the at least one slot 12 from the second end thereof, the orientation segment 64 has the engagement portion 65 formed on the inner side thereof and retained with the one tooth 41, and the first resilient element 66 abuts against the orientation segment 64 and is fixed in the chamber 53, as shown in FIGS. 7, 7-1, 702, 8, 8-1, and 8-2.

Figure 2:
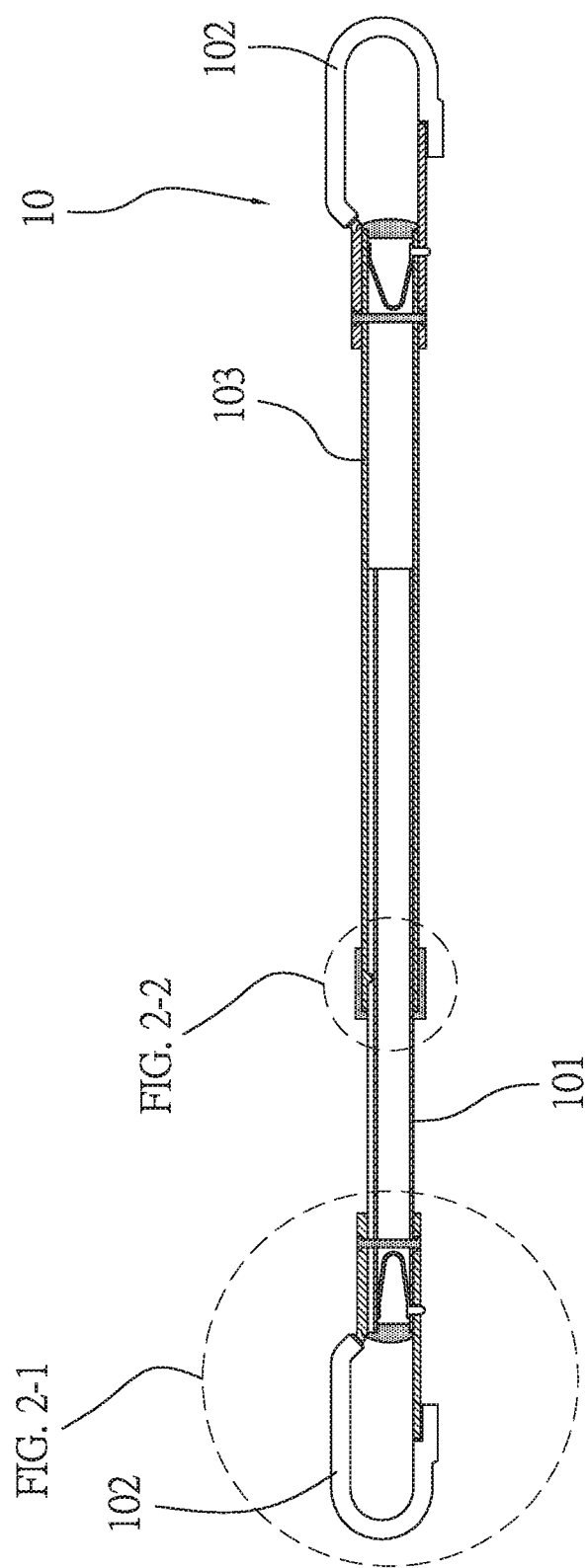
FIG. 2 is a cross sectional view showing the assembly of the conventional top tube adaptor.
Figures 1, 2:
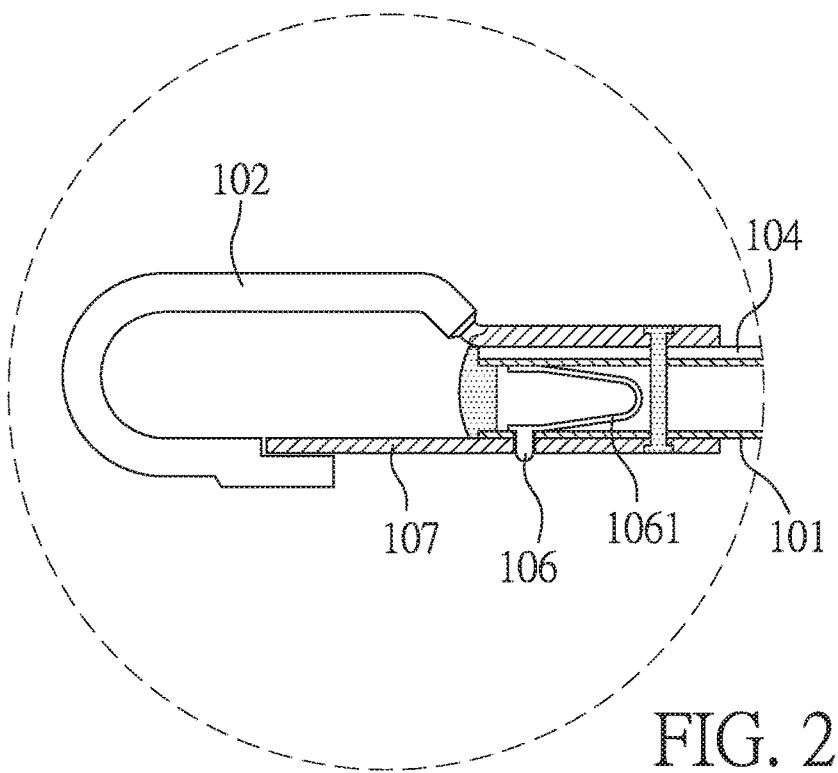
Figure 2:
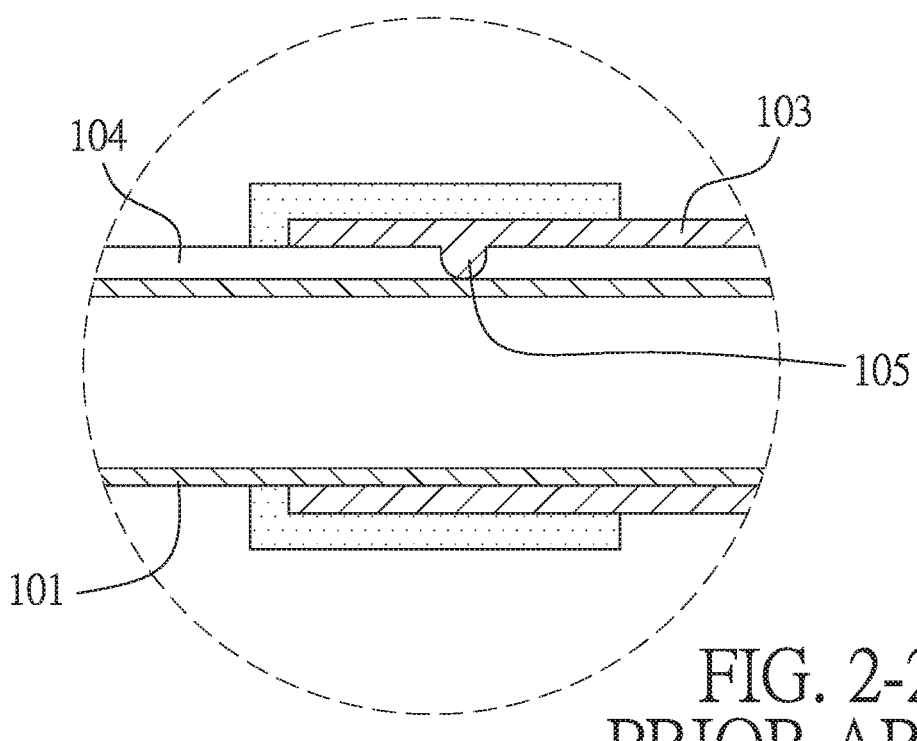
Figure 3:
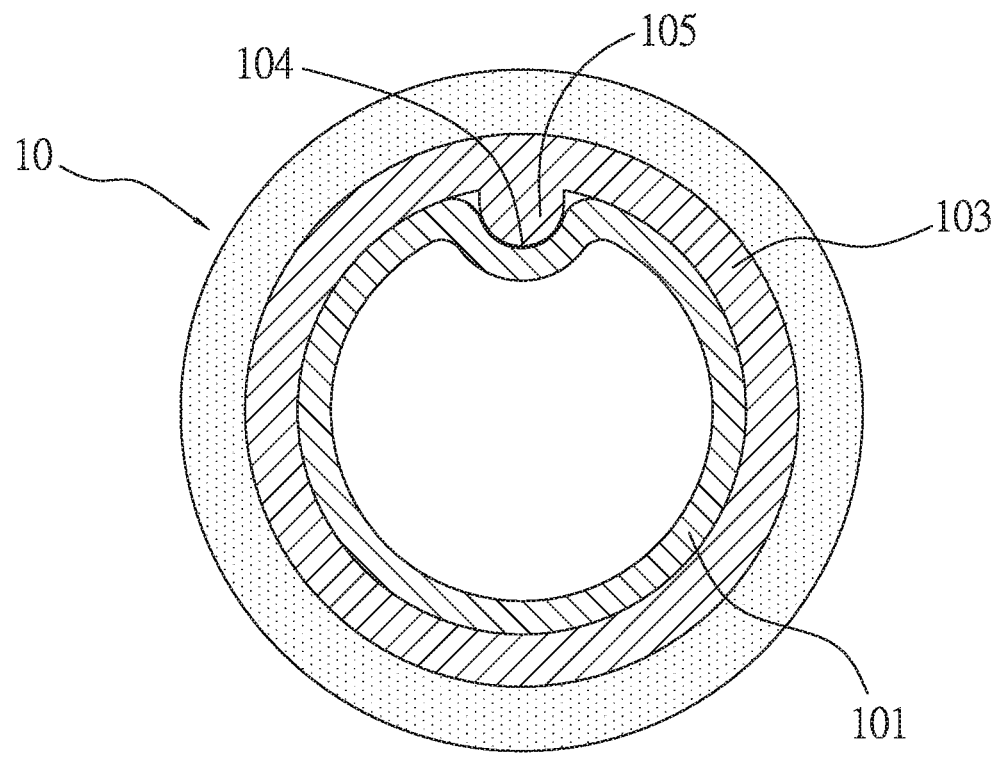
FIG. 3 is a cross sectional view of FIG. 2 of a conventional top tube adaptor.
Figure 4:
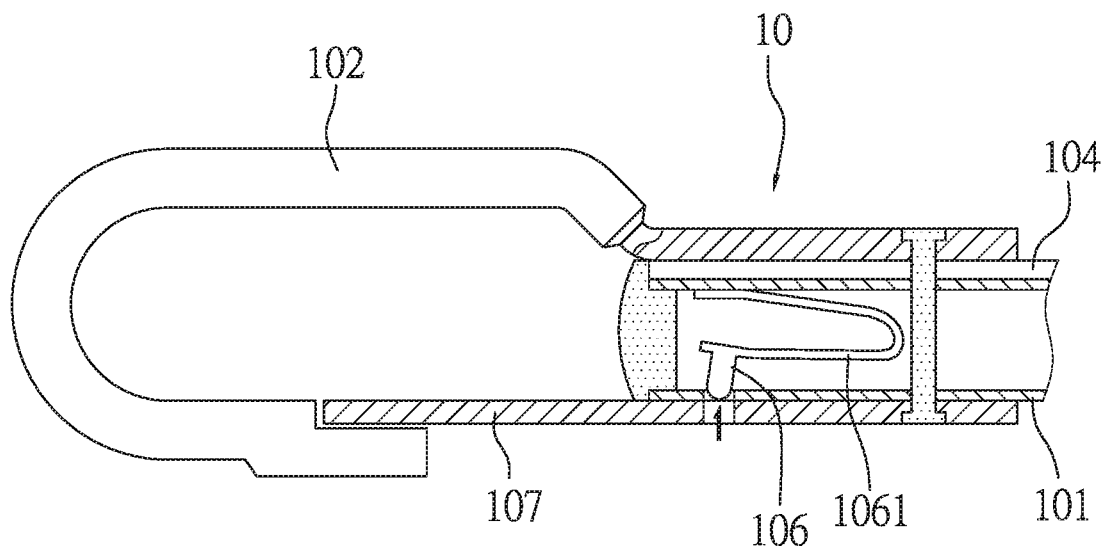
FIG. 4 is a cross sectional view showing the operation of FIG. 2 of a conventional top tube adaptor.
Figure 5:
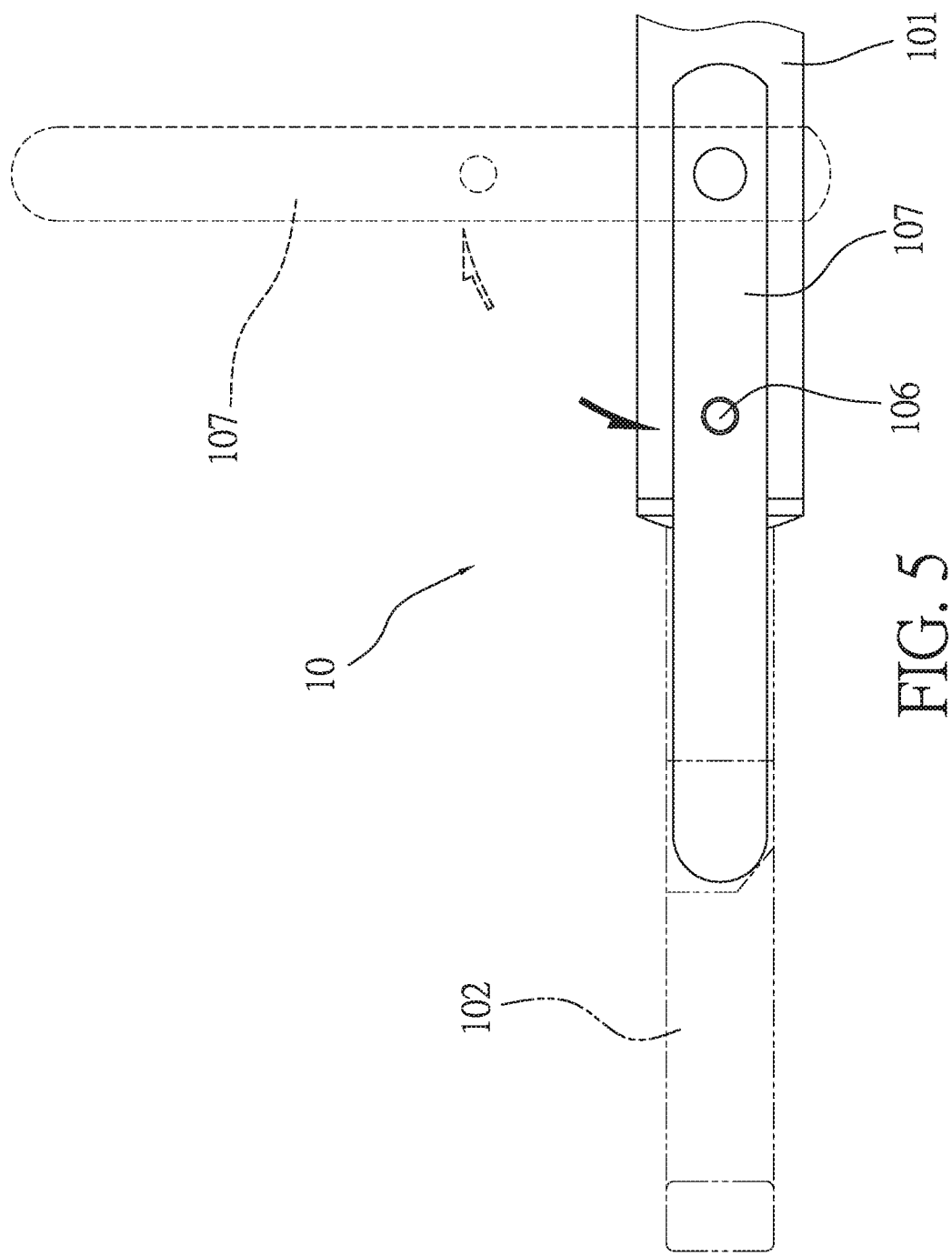
FIG. 5 is a bottom plan view of FIG. 2 of a conventional top tube adaptor.
Figure 6:
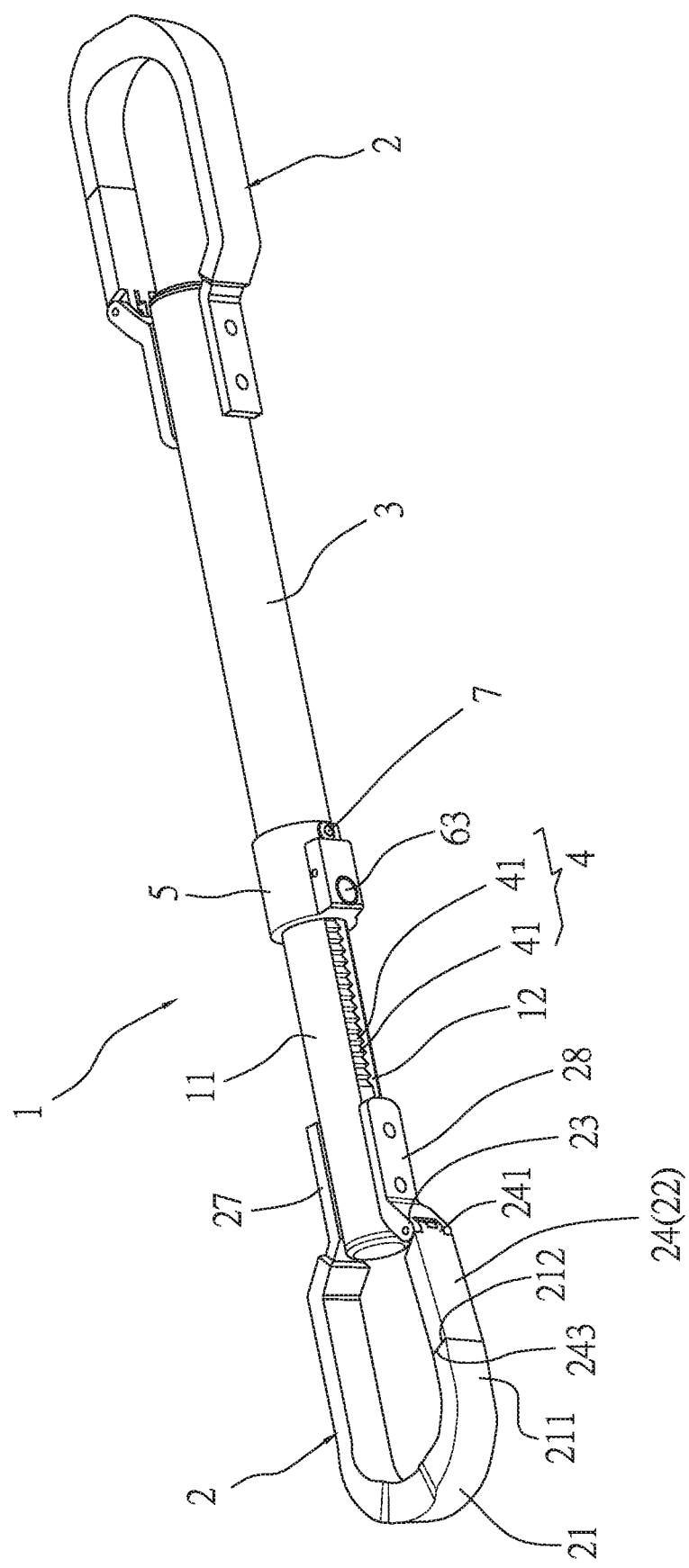
FIG. 6 is a perspective view showing the assembly of a top tube adaptor according to a preferred embodiment of the present invention.
Figures 1, 7:
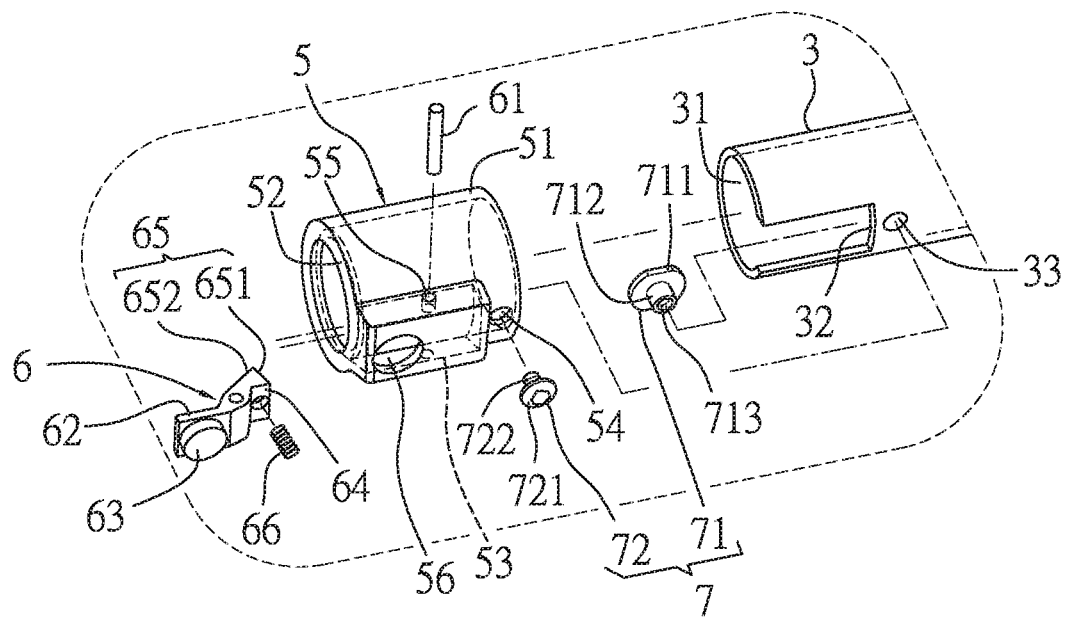
FIG. 7 is a perspective view showing the exploded components of the top tube adaptor according to the preferred embodiment of the present invention.
Figures 2, 7:
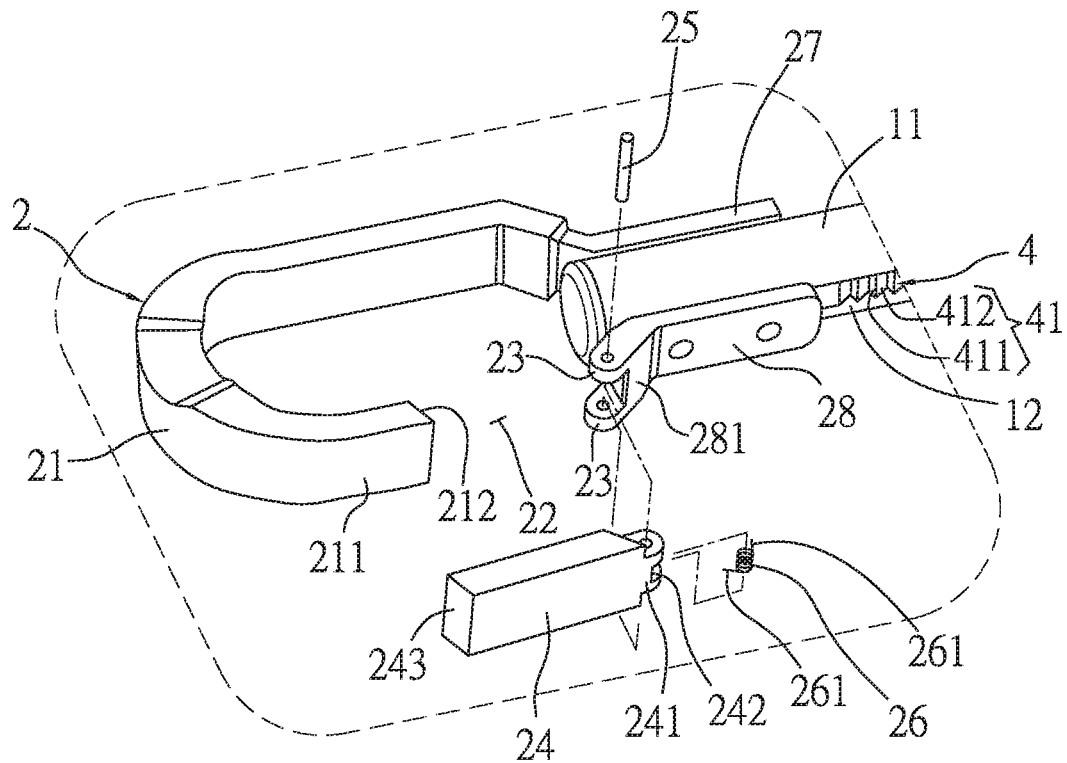
Figure 8:
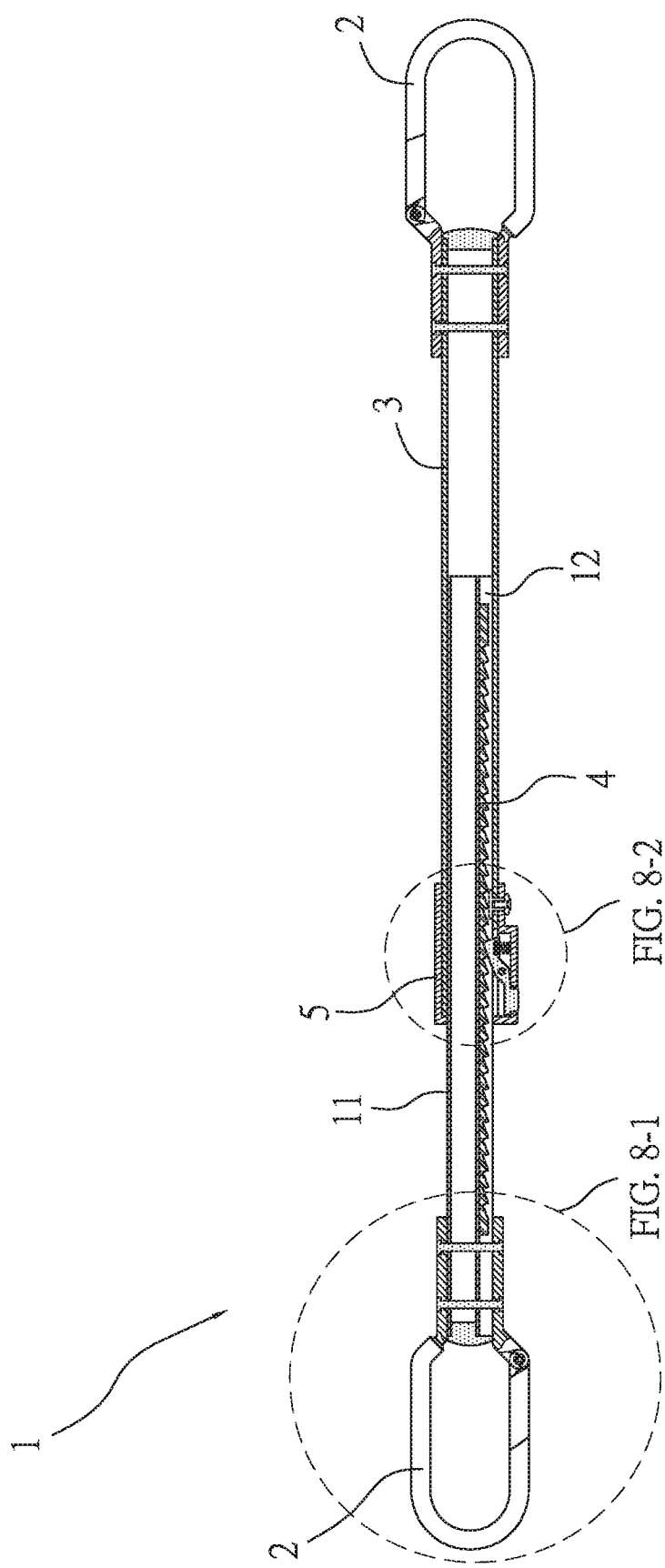
FIG. 8 is a cross sectional view showing the assembly of the top tube adaptor according to the preferred embodiment of the present invention.
Figures 1, 8:
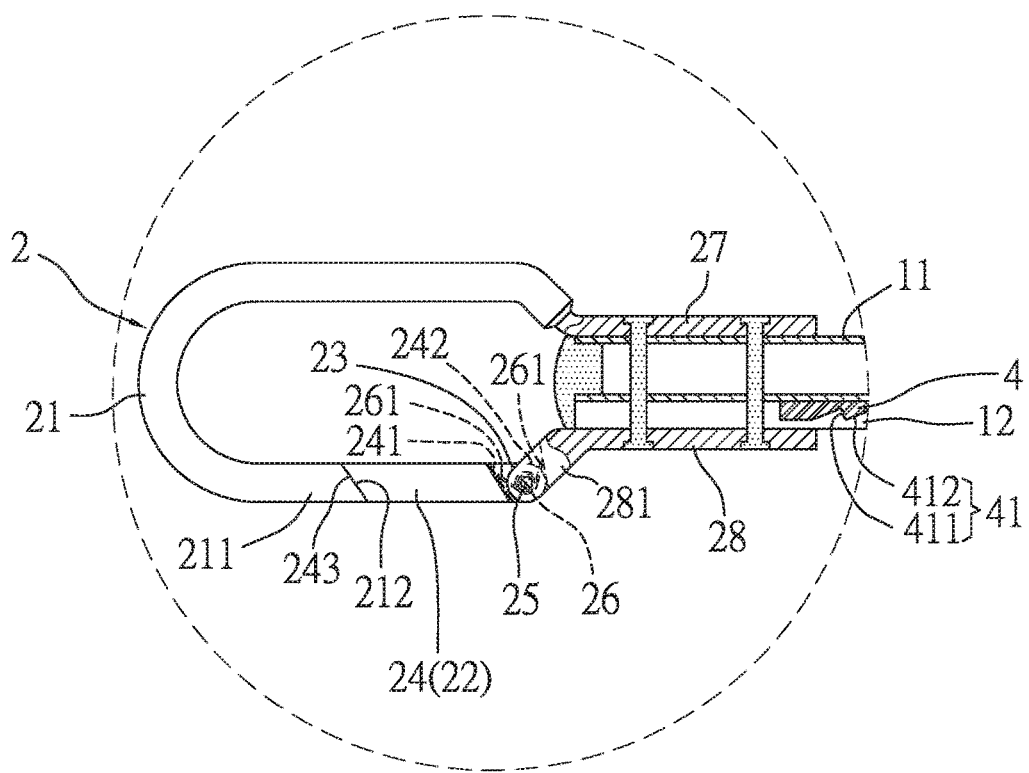
Figures 2, 8:
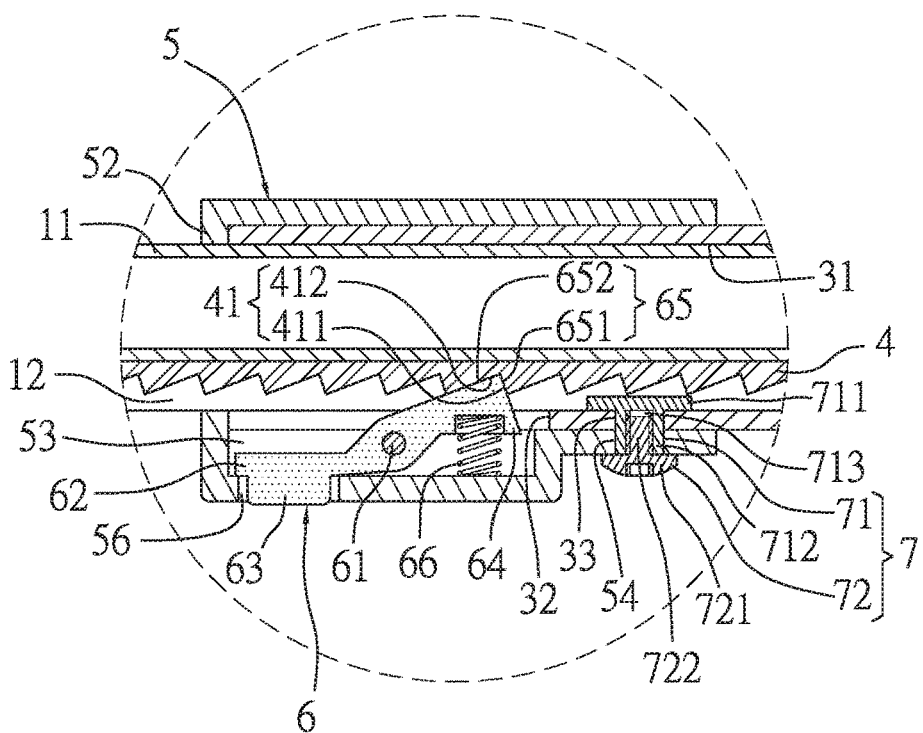
Figure 9:
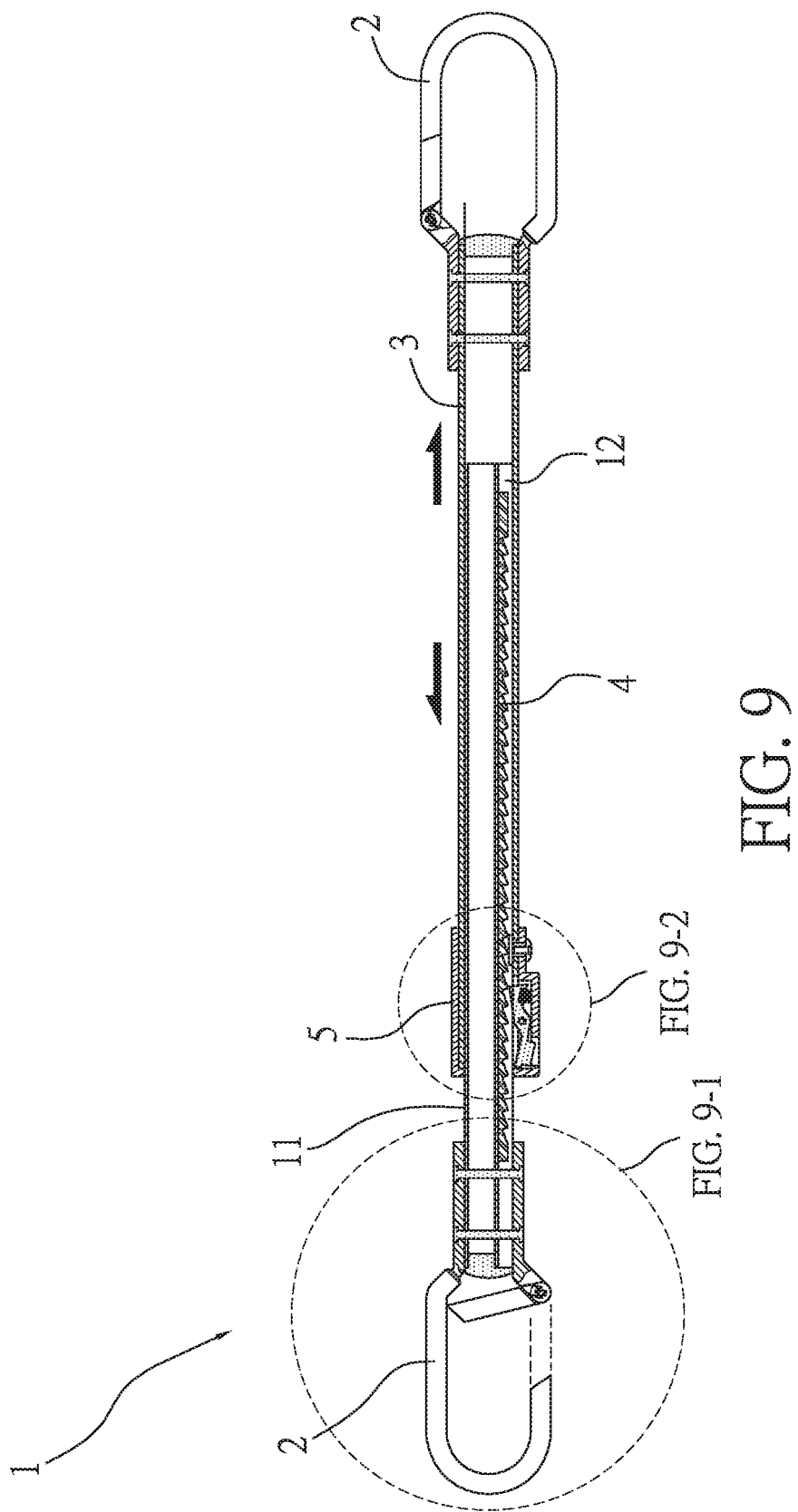
FIG. 9 is a cross sectional view showing the operation of the top tube adaptor according to the preferred embodiment of the present invention.
Figures 1, 9:
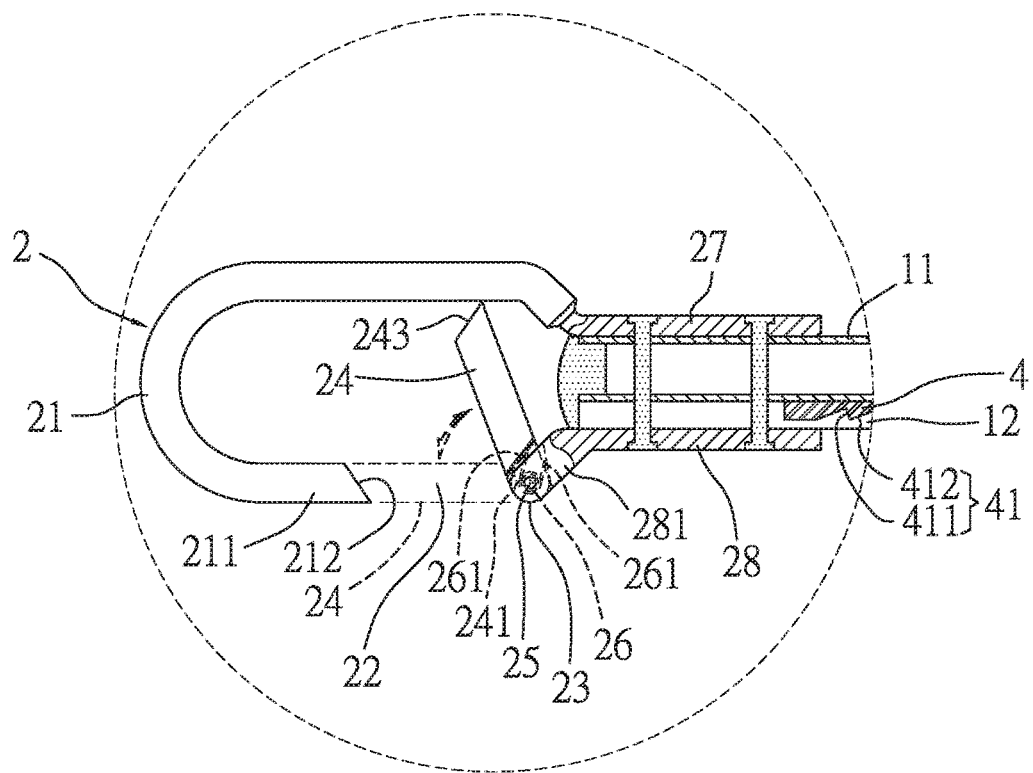
Figures 2, 9:
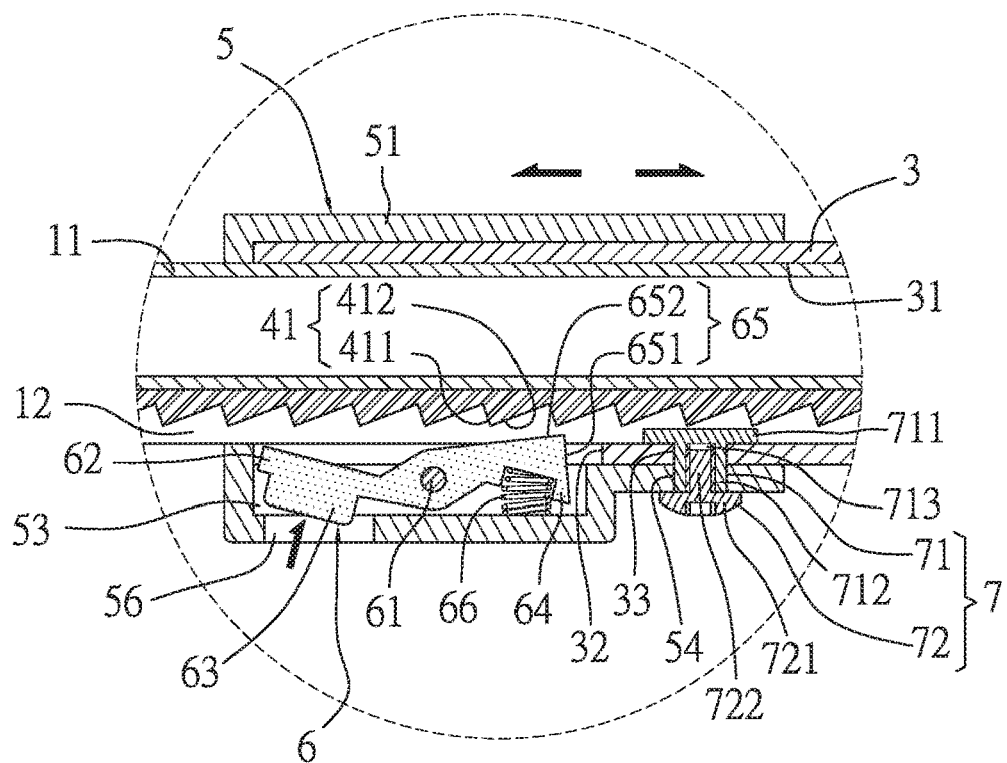
Figure 10:
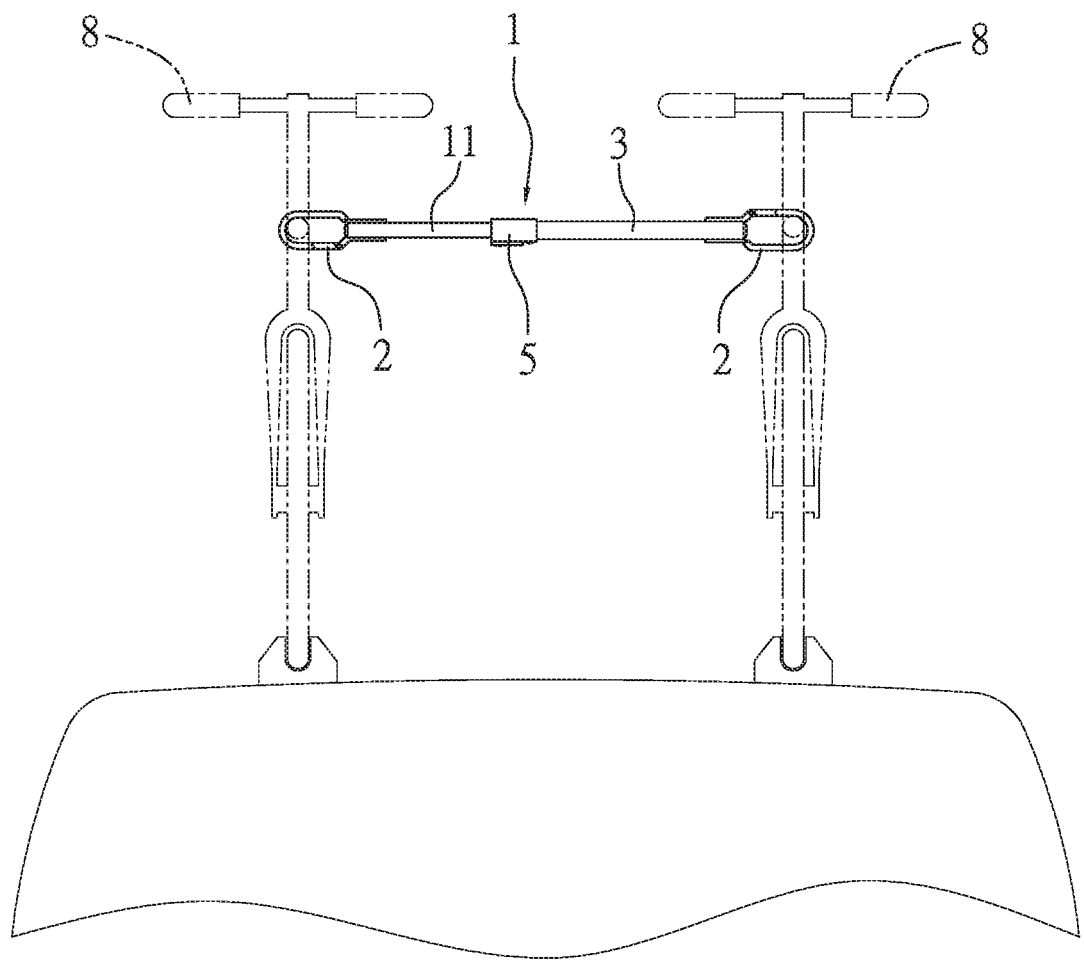
FIG. 10 is a side plan view showing the application of the top tube adaptor according to the preferred embodiment of the present invention.
Figure 11:
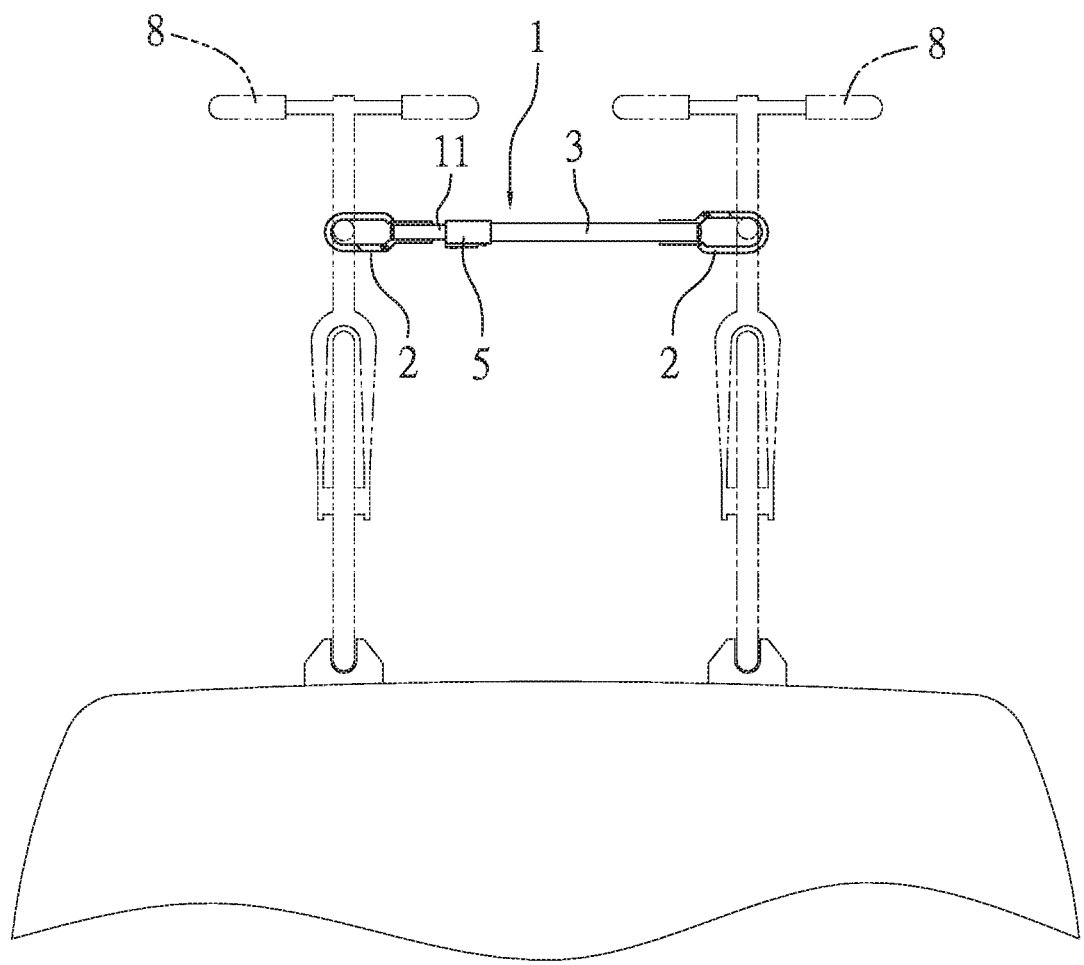
FIG. 11 is another side plan view showing the application of the top tube adaptor according to the preferred embodiment of the present invention.

In operation, the one abutting segment 261 of the second resilient element 26 abuts against the two tabs 23 so that the two tabs 23 close the cutout 22. On the contrary, after the two tabs 23 are moved or pressed to open the cutout 22, a component of a bicycle 8 is fitted in the respective fixer 2, as illustrated in FIGS. 9, 9-1, 9-2, 10, and 11. The body 11 of the top tube adaptor 1 is movably fixed with respect to the slidable rod 3 by using the at least one slot 12 and the orientation segment 64, and the engagement portion 65 is retained with the one tooth 41 after expanding or retracting the respective fixer 2 by moving the body 11 with respect to the slidable rod 3, thus positioning the slidable rod 3. As desiring to remove the slidable rod 3 so as to expand or retract the respective fixer 2, the press button 63 is pressed to remove the engagement portion 65 from the one tooth 41, as shown in FIGS. 9, 9-1, and 9-2. Thereafter, the body 11 is moved with respect to the slidable rod 3, thus expanding or retracting the respective fixer 2, as illustrated in FIGS. 10 and 11.

Thereby, the one abutting segment 261 of the second resilient element 26 abuts against the two tabs 23 so that the two tabs 23 close the cutout 22. On the contrary, after the two tabs 23 are moved or pressed to open the cutout 22, the body 11 is movably fixed with respect to the slidable rod 3 by using the at least one slot 12 and the orientation segment 64, and the engagement portion 65 is retained with the one tooth 41 after expanding or retracting the respective fixer 2 by moving the body 11 with respect to the slidable rod 3, thus positioning the slidable rod 3. As desiring to remove the slidable rod 3 so as to expand or retract the respective fixer 2, the press button 63 is pressed to remove the engagement portion 65 from the one tooth 41. Thereafter, the body 11 is moved with respect to the slidable rod 3 so as to expand or retract the respective fixer 2 easily.

While various embodiments in accordance with the present invention have been shown and described, it is clear to those skilled in the art that further embodiments may be made without departing from the scope of the present invention.

What is claimed is:

1. A top tube adaptor comprising:
a body, two fixers connected with two ends of the body respectively, and a slidable rod fitted with one of the two fixers;
wherein the body includes at least one slot defined on an outer wall thereof and configured to accommodate at least one positioning rack, and a respective positioning rack has multiple teeth;
wherein the slidable rod includes a channel configured to slide the slidable rod along the body, and the slidable rod includes a locking seat rotatably connected with an end of the slidable rod and accommodating a rotatable connector, wherein the rotatable connector includes two shafts rotatably connected with two sides of a middle section of the rotatable connector respectively, a press portion extending from a first end of the rotatable connector, a button extending from the press portion, an orientation segment extending into the at least one slot from a second end of the rotatable connector, an engagement portion formed on an inner side of the orientation segment and retained with one of the multiple teeth, and a first resilient element abutting against an inner side of the orientation segment and fixed in the locking seat;
wherein a respective fixer includes a curved hook extending from an end thereof, a cutout defined between the end of the respective fixer and the curved hook, two tabs located beside the cutout away from the curved hook, a coupling projection rotatably connected with the two tabs and closing the cutout, a column inserted through the two tabs, and a second resilient element fitted on the column, wherein the second resilient element has two abutting segments, one of the two abutting segments abuts against the two tabs, and the other abutting segment contacts with or removes from the coupling projection so as to close or open the cutout; and
wherein the two fixers are connected with two ends of the slidable rod respectively.

2. The top tube adaptor as claimed in claim 1, wherein the respective fixer further includes a locating member configured to connect with the body and an abutting section formed on the locating member; the locating member has the curved hook curvedly extending from the body, and the curved hook has a distal segment straightly extending to the cutout, the curved hook also has a tilted contact face formed on an edge of the distal segment facing the cutout; the abutting section has a slanted extension extending to the cutout, and the abutting section has the two tabs formed on a distal end thereof, wherein the coupling projection is rotatably connected between the two tabs to close the cutout, and the coupling projection has a connection knob extending from an end thereof and rotatably connected with the two tabs by ways of the column, the connection knob has a receiving orifice configured to accommodate the column on which the second resilient element is fitted, wherein the one abutting segment abuts against the receiving orifice, and the other abutting segment contacts with the connection knob so as to close the cutout, wherein the coupling projection further has a beveled biasing face formed on the other end thereof opposite to the connection knob and configured to contact with the tilted contact face.

3. The top tube adaptor as claimed in claim 1, wherein a respective tooth has a first retaining face perpendicular to a bottom of the positioning rack and has a first sliding face connected with the push face; the engagement portion of the orientation segment has a second retaining face for engaging with the first retaining face, and the engagement portion has a second sliding face for engaging with the first sliding face.

4. The top tube adaptor as claimed in claim 3, wherein the body includes the at least one slot defined on an outer wall thereof and configured to accommodate the at least one positioning rack, and the respective positioning rack has the multiple teeth; the slidable rod includes a recess defined the end thereof adjacent to the rotatable connector and includes a first fixing orifice beside the recess, wherein the locking seat includes a first fringe fitted with the slidable rod adjacent to the first fixing orifice, a second fringe contacting with the slidable rod and opposite to the first fringe, a chamber corresponding to the recess, and a second fixing orifice corresponding to the first fixing orifice; wherein the chamber matches with the recess and accommodates the rotatable connector, the chamber has a third fixing orifice configured to accommodate a shank and has a fourth fixing orifice located proximate to the second fringe so that the button extends out of the fourth fixing orifice, wherein a defining member is inserted through the first fixing orifice and the second fixing orifice, and the defining member includes a first part and a second part; wherein the first part has a first head extending into the at least one slot, a peg extending outward from the first head and inserted into the first fixing orifice and the second fixing orifice, and a threaded orifice defined in the first peg; the second part has a second head and has a screwing stem extending outward from the second head and screwed with the threaded orifice, such that the first fringe and the slidable rod are fixed between the first and the second head; wherein the rotatable connector includes the orientation segment extending into the at least one slot from the second end thereof, the orientation segment has the engagement portion formed on the inner side thereof and retained with the one tooth, and the first resilient element abuts against the orientation segment and is fixed in the chamber.

\* \* \* \* \*